G. A. GABRIEL AND J. T. SKILLINS.
ROLLER BEARING.
APPLICATION FILED OCT. 11, 1918.
1,400,599.  Patented Dec. 20, 1921.
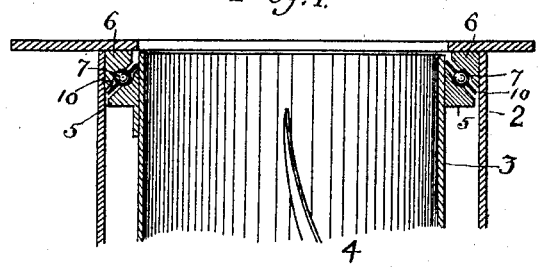
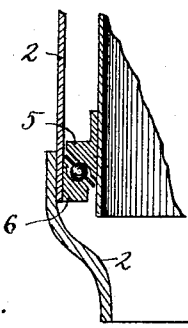
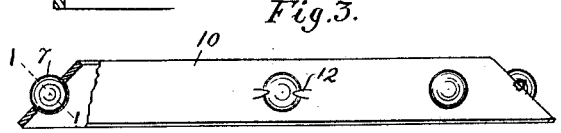
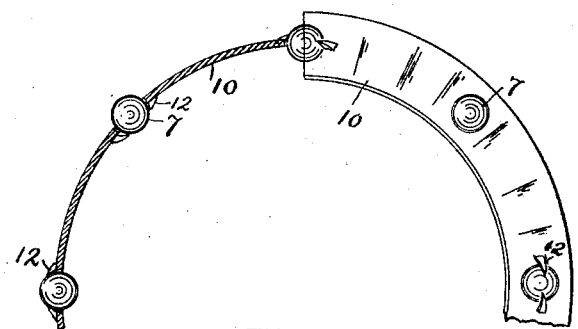
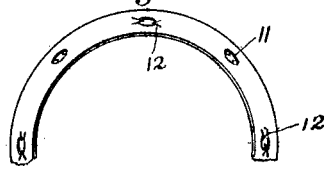

UNITED STATES PATENT OFFICE.

GEORGE A. GABRIEL AND JOHN T. SKILLINS, OF WESTBROOK, MAINE, ASSIGNORS TO DANA COTTON HARVESTER COMPANY, OF WESTBROOK, MAINE, A CORPORATION OF MAINE.

ROLLER-BEARING.

1,400,599.  Specification of Letters Patent.  Patented Dec. 20, 1921.

Application filed October 11, 1918. Serial No. 257,712.

*To all whom it may concern:*

Be it known that we, GEORGE A. GABRIEL and JOHN T. SKILLINS, citizens of the United States, residing at Westbrook, in the county of Cumberland and State of Maine, have invented certain new and useful Improvements in Roller-Bearings, of which the following is a specification.

Our invention relates to ball bearings and it is particularly applicable to vacuum cotton picking nozzles and other like structures in which the thrust is longitudinal of the rotating parts. These picking nozzles have a cylindrical picking tube made to rotate inside of a cylindrical casing, the inner tube being rotated by the incoming air current induced by a suitable vacuum fan and acting on blades attached to the tube.

In these picking nozzles it is very desirable that the picking tube should revolve with as little friction as possible, and the present invention is directed to the production of a bearing having two opposing conical surfaces with opposing annular recesses in which the balls travel with ball retainer to hold the balls separate from each other and to confine them within the two opposing ball races where they will have practically only two points of contact.

A ball bearing of this character is simple in construction, the balls are held steadily in place with little tendency to become displaced and the tube rotates with an exceedingly small amount of friction.

In the accompanying drawing we have represented our ball bearing in its preferred form as applied to one end of a vacuum nozzle for picking cotton although it is to be understood that the invention is applicable to any ball bearing where there are opposing conical surfaces.

Referring to the drawings,

Figure 1 is a longitudinal section through one end of the vacuum nozzle with my ball bearing applied thereto, Fig. 2 is a cross section of the ball bearing proper, Fig. 3 is a side elevation of the ball retainer partly in section, Fig. 4 is a part plan of the retainer and part section on the line 1—1 of Fig. 3 and, Fig. 5 is a partial plan of the retainer with the balls omitted.

Referring to the drawings, 2 represents the casing of the picking nozzle, 3 is the rotating picking tube within the casing and 4 is one of the inclined blades on the picking tube by means of which the tube is rotated by the incoming air.

The ball bearing is made up of two rings, 5 and 6 having opposing conical surfaces spaced apart a little less than the diameter of the balls 7. As herein shown the rings 5, one at each end of the nozzle are secured to the inner tube 3 and the rings 6 to the casing 2 and the balls 7 are interposed between the two conical surfaces of the rings traveling in shallow grooves 8 and 9 formed in the rings 5 and 6 respectively.

The cross section of each of the shallow grooves is preferably a flat circular arc. The surface of the groove where the ball contacts in each groove is tangential to the surface of the ball and a line drawn from one point of contact to the opposite point of contact is normal to the surface of the ball and to the surface of the groove.

Thus when the nozzle is in an upright position with the thrust on the bearings longitudinal of the nozzle, the balls will tend to remain in their respective grooves and to travel in these grooves as the tube rotates.

The balls are held apart and prevented from rubbing together by a retainer which is a conical ring having openings through which the balls project on each side with fingers or projections on the faces of the conical ring for holding the ring in position midway between the conical surfaces.

As here shown, the conical ring 10 has a series of openings 11 here shown as eight in each ring. These openings are a trifle larger than the balls when the latter get out of place. The ring is held in place centrally between the two opposing conical surfaces by small flattened fingers or projections which are formed on the faces of the conical ring and project inward adjacent to the surface of each ball far enough to hold the ring in place.

These fingers are disposed on alternate sides of alternate balls so that half the fingers will come on one side of the ring and half on the other. Thus the tendency of the ring to move toward one side will be resisted by the fingers on the opposite side and vice versa. The number of these fingers is in this way reduced to the minimum and the amount of the friction of which there must be a slight amount is also greatly reduced.

A ball bearing made in this way where the thrust is longitudinal of the rotating cylinders is exceedingly simple and effective.

Our invention is applicable not only to picking nozzles but to any structure where the thrust is longitudinal of the rotating parts.

We claim:

A ball bearing having two opposing conical faces, each face having a shallow groove of greater radius of transverse curvature than the balls forming a ball race, balls running therein, the balls contacting with opposing points in said grooves on a line substantially parallel with the axis of rotation of the bearing, the surfaces of the grooves at the points of contact being at right angles to said axis of rotation and a cage for holding the balls together consisting of a thin ring having openings slightly larger than the ball and retaining projections on one side of the ring only, the retaining projections alternating on opposite sides of the ring with the entire series of balls.

In testimony whereof we have affixed our signatures.

GEORGE A. GABRIEL.
JOHN T. SKILLINS.